United States Patent [19]

Kilmister et al.

[11] 4,157,039
[45] Jun. 5, 1979

[54] DETECTION OF THE TEMPERATURE OF SHEET OR STRIP MATERIAL

[75] Inventors: George T. F. Kilmister, Christchurch; Douglas J. Thomas, Poole, both of England

[73] Assignee: Loewy Robertson Engineering Company Limited, Poole, England

[21] Appl. No.: 678,051

[22] Filed: Apr. 19, 1976

[30] Foreign Application Priority Data

May 12, 1975 [GB] United Kingdom ............... 19777/75

[51] Int. Cl.² .............................................. G01K 1/16
[52] U.S. Cl. ......................................... 73/345; 73/351
[58] Field of Search .................... 73/343 R, 345, 351, 73/144; 72/13, 33; 308/9, DIG. 2

[56] References Cited

U.S. PATENT DOCUMENTS

| 2,627,182 | 2/1953 | Quereau et al. ........................ 73/351 |
| 2,908,164 | 10/1959 | Bamber ..................... 308/DIG. 1 X |
| 3,677,334 | 7/1972 | Bathla et al. ...................... 73/345 X |
| 3,850,032 | 11/1974 | Rodach et al. ......................... 73/144 |
| 3,879,594 | 4/1975 | Shillito ................................ 73/351 X |
| 3,895,689 | 7/1975 | Swearingen ........................ 308/9 X |
| 3,902,363 | 9/1975 | Ishimoto ........................... 73/144 X |

FOREIGN PATENT DOCUMENTS 1160112 7/1969 United Kingdom.

*Primary Examiner*—Anthony V. Ciarlante
*Attorney, Agent, or Firm*—Brisebois & Kruger

[57] ABSTRACT

For detecting the temperature profile of a moving strip, strip is caused to pass in contact with a series of hollow rotors which are spaced across the strip width, and each of which is supported by a gas bearing. A thermal detector is located within each rotor to respond to the temperature of that part of the strip in contact with the rotor.

The rotors may also be used to detect the variation in tension across the strip width. In that case, the thermal detectors can modify the tension measurements to compensate for thermal errors.

9 Claims, 5 Drawing Figures

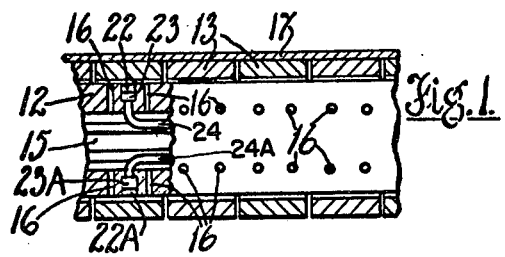
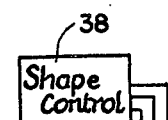
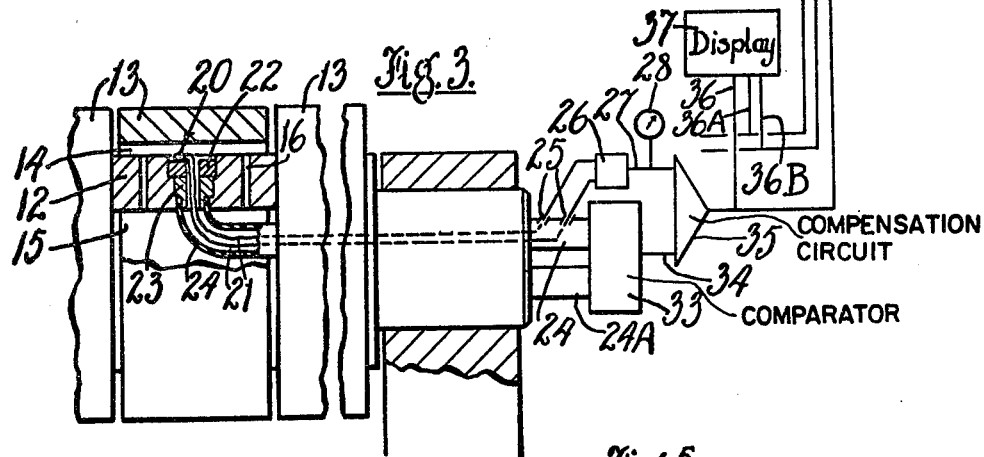
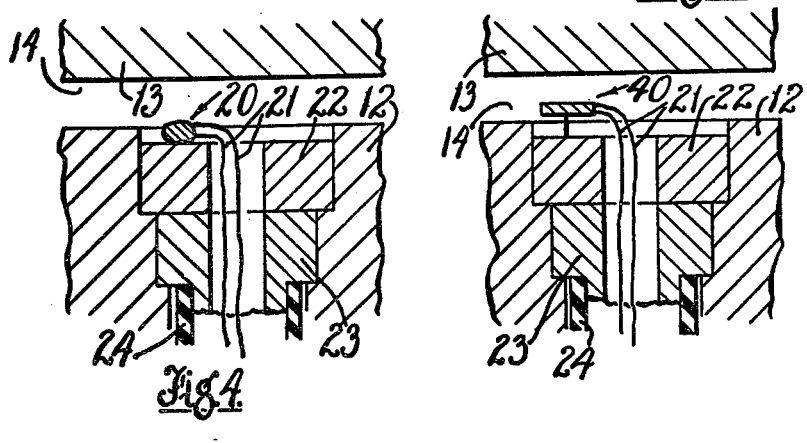

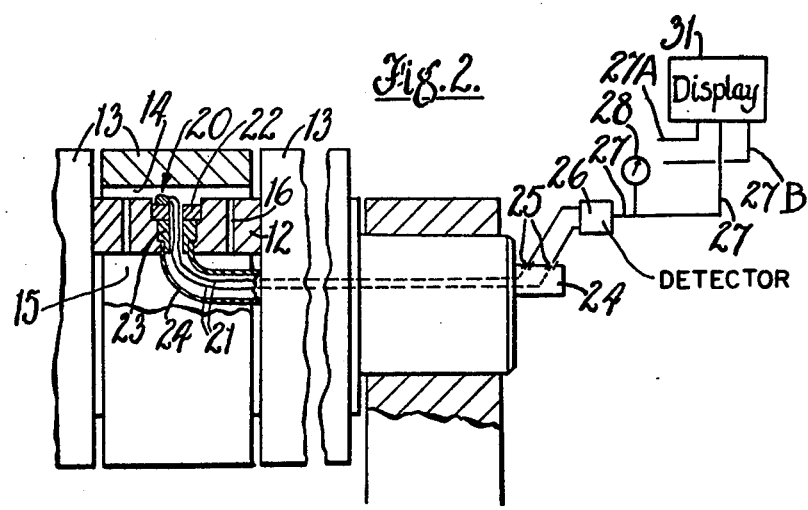

DETECTION OF THE TEMPERATURE OF SHEET OR STRIP MATERIAL

This invention relates to the detecting of the temperature of sheet or strip material and is particularly concerned with detecting variation in temperature across the width of a strip during movement thereof. While the invention is concerned primarily with metal strip, it is also applicable to strip of other materials, such as paper and plastics.

Metal strip emerging from a rolling mill has been found to have a non-uniform temperature across its width, i.e., transverse to the direction of motion. The widthwise temperature variation can arise for a number of reasons, such as the selective cooling of some parts of the rolls for shape control, and changes in the reduction in the strip along the barrels of the rolls. Widthwise temperature variation in the strip is sometimes undesirable, in that it can itself give rise to non-flatness in the strip, can complicate the further treatment of the strip, and can falsify to some extent any measurement of strip flatness made on the strip as it leaves the mill.

Once the temperature profile of the strip can be ascertained it is possible to take remedial action at the mill towards achieving uniformity in the temperature across the strip. Alternatively or additionally, the detection of width-wise temperature variation may be employed to assist in the control of the mill towards achieving strip which when cooled to ambient temperature has a desirable degree of flatness.

In accordance with the present invention, apparatus for detecting the temperature variation of a moving strip across its width comprises a plurality of heat conducting members adapted to engage a surface of the strip at locations spaced across the strip width; an independent gaseous pressure bearing for supporting each of the members in contact with the strip; and for each of at least some of the members, temperature responsive means in the gas bearing of the respective member, spaced from that member, and arranged to receive heat transmitted by the member.

In a preferred form, the apparatus comprises an arbor; a plurality of heat-conducting rotors surrounding the arbor at axially spaced positions, each rotor having an internal diameter greater than the arbor diameter; conduits to supply gas under pressure between the arbor and each of the rotors, whereby each rotor is carried on a gas bearing; and for each of at least some of the rotors, temperature responsive means carried by the arbor and arranged to receive heat transmitted by the respective rotor towards the arbor.

Although the various temperature responsive means may be mounted on the arbor, it is preferred to have them located in the rotor-arbor spaces, being carried by, but out of contact with, the arbor, so that they are affected to a smaller extent by heat conduction along the arbor.

The apparatus may be arranged to detect only the temperature variation of the strip, or it may also respond to width-wise variations in the strip tension by including at least one pressure transducer in each of the rotor-arbor spaces. The signals representing respective temperature variation and tension variation may be displayed or employed independently, or may be combined to give an indication of the flatness of the strip when cooled.

The invention will be more readily understood by way of example from the following description of apparatus in accordance therewith for detecting the widthwise temperature profile of strip, reference being made to the accompanying drawings, in which:

FIG. 1 is a diametrical section through a part of the apparatus;

FIG. 2 shows one of the bearings on larger scale, together with a diagrammatic showing of associated display equipment, FIG. 3 is similar to FIG. 2 but showing additionally devices for indicating the widthwise tension variation in the strip, FIG. 4 is a sectional view on larger scale, showing one type of thermocouple mounting, and FIG. 5 is a similar view to FIG. 4, but showing a thermopile.

The temperature profile indicating apparatus consists of a hollow arbor 12 extended over the length of the device, and a number of individual rotors 13 arranged side-by-side and about the arbor 12 to form a series of air bearings. The rotor-arbor space 14 of each air bearing is in communication with the bore 15 of the arbor 12 through pairs of passages 16 located at intervals around the arbor. The bore 15 is connected to a supply (not shown) of air under pressure, which, in the absence of any load on the rotors 13, causes those rotors to lie approximately symmetrically about, and out of contact with, the arbor 12.

The temperature profile indicating apparatus is used to measure the temperature profile of strip 17 leaving a rolling mill (not shown) after having been rolled. The indicating apparatus is located at the pass-line of the strip 17, with the rotors 13 in contact with the strip 17 and urging the latter upwardly. The tension in the strip reduces the spacing between each rotor 13 and the arbor 12.

In order to get an indication of the temperature of the strip 17 in contact with the rotor 13 of each of the bearings, each bearing is provided with temperature responsive means, illustrated as a thermocouple 20 located in the rotor-arbor space 14 adjacent the contact between the rotor 13 and the strip 17. The thermocouple consists of a nickel-aluminium wire and a nickel-chromium wire connected to leads 21 which pass through the bore of a bored brass screw 22 threaded into arbor 12, centrally of the axial length of the rotor 13 and through a plug 23. The leads 21 then pass through a flexible pipe 24 the end of which is secured in place by the plug 23 and which leads through the arbor bore 15 and out through an internally fitted bulkhead. The leads 21 emerge from the pipe 24 outside the arbor 12, through seals 25, and are connected to a detection circuit 26, which gives an output on line 27 in accordance with the temperature of the thermocouple 20.

Because the rotor-arbor separation is small, being of the order of $1.25 \times 10^{-3}$ inches, there is excellent heat conduction between the rotor 13 and the thermocouple; the rotor itself is metal and conducts heat from the strip 17 well. The temperature of the thermocouple thus follows the temperature of that part of the strip 17 in contact with the rotor 13 with which the thermocouple is associated. The temperature of the strip part can be displayed on a meter 28 connected to line 27.

Each of the other rotors 13 has temperature responsive means similar to the thermocouple 20 and its connections; the output leads corresponding to lead 27 are indicated at 27A, 27B etc. The leads 27, 27A are led to a cathode ray tube 31 to give a visual display of the variations in temperature across the strip 17. The leads 27, 27A may also be connected to control means on the mill, such as the cooling jets arranged along the roll barrels, in order to control the cooling, or heating, of the strip differentially across its width with the aim either of achieving uniformity of temperature or of improving the shape of the rolled strip.

The described temperature profile indicating apparatus may have incorporated with it detectors for sensing the variation in the tension in the strip across its width; if the strip is iso-thermal the absence of uniformity in strip tension is an indication of non-flatness in the strip when not subject to tension.

As mentioned above, the tension of that part of the strip 17 in contact with each of the rotors 13 reduces the spacing of the respective rotor from the arbor 12, and, if the tension in the strip varies across its width, the degree of separation between the rotors and the arbor correspondingly varies along the arbor and results in variations in the rotor-arbor spaces 14. In order to sense changes in the rotor-arbor spacing of each rotor, each rotor has associated with it two pressure detectors, one located in the arbor 12 adjacent the passing strip 17, and the other diametrically opposite the first detector. The two detectors are illustrated in FIG. 1, the detector adjacent the strip being constituted by the bored screw 22, the plug 23 and the flexible pipe 24 connected to it; the other detector is constituted by a similar bored screw 22A, plug 23A and similar connecting pipe 24A. The two pipes 24, 24A are led to a comparator, which is indicated schematically at 33 (FIG. 3) and which compares the air pressures in the two pipes and gives an electrical output on line 34 according to the difference in pressure in the in the spaces 14 adjacent the screws 22, 22A. Each of the other rotors is provided with a similar pressure detector, the pipes of the detector being brought to another comparator similar to 33. The output lines 34 from the various comparators may be led to a display showing the tension variation across the strip width, and/or to shape-control means on the mill. Alternatively, or additionally, the signals in lines 34 may be applied to shape control means on the rolling mill in order that the profile or shape of the strip being rolled may be modified to reduce any profile irregularity indicated by those signals. The shape control means may comprise means for selectively bending a roll or rolls of the mill or means for selectively controlling the roll coolant sprays across the width of the strip.

Variations in temperature across the strip can distort the tension profile, in that a higher temperature in one part of the strip relative to the remainder, for example, causes a greater expansion lengthwise, with the result that the detected widthwise tension variation measured in the newly rolled strip differs from that obtained when the strip cools to a uniform ambient temperature. In order to get a more accurate indication of the non-flatness that will be present in the cooled strip, the tension signal derived on each line 34 may be compensated by the detected temperature of the corresponding part of the strip.

Thus, FIG. 3 shows the output on line 34 from the comparator 33 being applied with the temperature signal on line 27 to a compensating circuit 35, in which the signal on line 34 is adjusted according to the detected temperature. The output from circuit 35 is applied on line 36, along with the corresponding signals on lines 36A, 36B from the other rotors 13, to a cathode ray tube 37, which is similar to 31 and which displays the temperature corrected variation in tension across the strip width. The signals on lines 36, 36A can also be applied if required to shape control equipment 38 on the mill.

In place of the thermocouple 20 as shown clearly in FIG. 4, a thermopile or other temperature sensitive device 40 may be employed, as shown in FIG. 5, where it appears out of contact with the arbor. The thermopile 40 is consequently little affected by heat conduction along the arbor.

We claim:

1. Apparatus for detecting width-wise temperature variation of a moving strip which acts as a source of heat, comprising:
    (a) an arbor;
    (b) a plurality of heat-conducting rotors surrounding the arbor at axially spaced positions, each rotor having an internal diameter greater than the arbor diameter;
    (c) conduits to supply gas under pressure between the arbor and each of the rotors, whereby each rotor is carried on a gas bearing; and
    (d) a plurality of separate temperature responsive means carried by the arbor, each said means being located in the gas bearing between the arbor and a different one of the rotors in order to receive heat transmitted by the respective rotor from the strip towards the arbor, and yield individual indications of the temperature at said spaced locations so as to permit the detection of differences in said temperature between said locations.

2. Apparatus according to claim 1, in which each temperature responsive means is an electrical temperature transducer and is electrically connected to indicating means.

3. Apparatus according to claim 3, in which all the temperature responsive means are electrically connected to the indicating means adapted to indicate the temperature.

4. Apparatus according to claim 1, in which each temperature responsive means is a thermocouple.

5. Apparatus according to claim 2, in which each temperature responsive means is a thermopile.

6. Apparatus according to claim 1, in which for each rotor, there is a pressure transducer to detect the gas pressure within the respective rotor-arbor space and hence the tension of that part of the strip engaged by the respective rotor.

7. Apparatus for detecting width-wise temperature variation of a moving strip, comprising:
    (a) an arbor;
    (b) a plurality of heat-conducting rotors surrounding the arbor at axially spaced positions, each rotor having an internal diameter greater than the arbor diameter;
    (c) conduits to supply gas under pressure between the arbor and each of the rotors, whereby each rotor is carried on a gas bearing;
    (d) for each of a plurality of the rotors, temperature responsive means carried by the arbor and arranged to receive heat transmitted by the respective rotor towards the arbor, and yield individual indications of the temperature at said spaced locations so as to permit the detection of differences in said temperature between said locations, and a pressure transducer to detect the gas pressure within the respective rotor-arbor space and hence the tension of that part of the strip engaged by the respective rotor; and (e) a modifying circuit to which the temperature responsive means and the pressure transducer of the same rotor are connected and which is arranged to modify the signal of the pressure transducer by the signal from the temperature responsive means.

8. Apparatus for detecting width-wise temperature variation of a moving strip, comprising:
   (a) an arbor;
   (b) a plurality of heat-conducting rotors surrounding the arbor at axially spaced positions, each rotor having an internal diameter greater that the arbor diameter;
   (c) conduits to supply gas under pressure between the arbor and each of the rotors, whereby each rotor is carried on a gas bearing;
   (d) for each of a plurality of the rotors, temperature responsive means carried by the arbor and arranged to receive heat transmitted by the respective rotor towards the arbor, and yield individual indications of the temperature at said spaced locations so as to permit the detection of differences in said temperature between said locations, and a pressure transducer to detect the gas pressure within the respective rotor-arbor space and hence the tension of that part of the strip engaged by the respective rotor; and
   (e) control means to which the modified signals from the pressure transducer, representing the widthwise flatness of the strip, are applied to control that flatness.

9. A method of controlling the profile of strip being rolled by a rolling mill, comprising urging into engagement with the strip leaving the mill a plurality of rotors which are spaced widthwise of the strip and which are supported about an arbor by compressed gas supplied to the rotor-arbor spaces, detecting the gas pressure within each rotor arbor space, sensing the temperature of each rotor obtaining for each rotor a signal dependent on the detected pressure but modified by the detected temperature, and controlling the mill by the signals to vary the shape of the strip.

* * * * *